May 26, 1936.  H. E. SWIFT  2,042,079
AUTOMOTIVE VEHICLE
Original Filed April 24, 1930   2 Sheets-Sheet 1
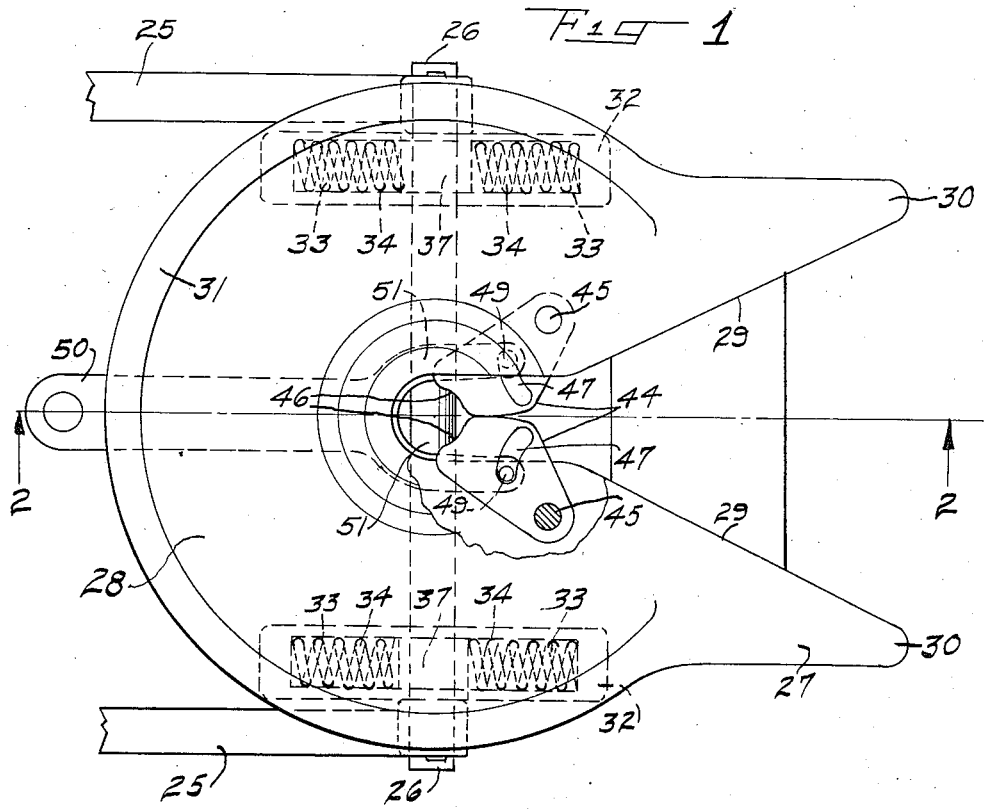
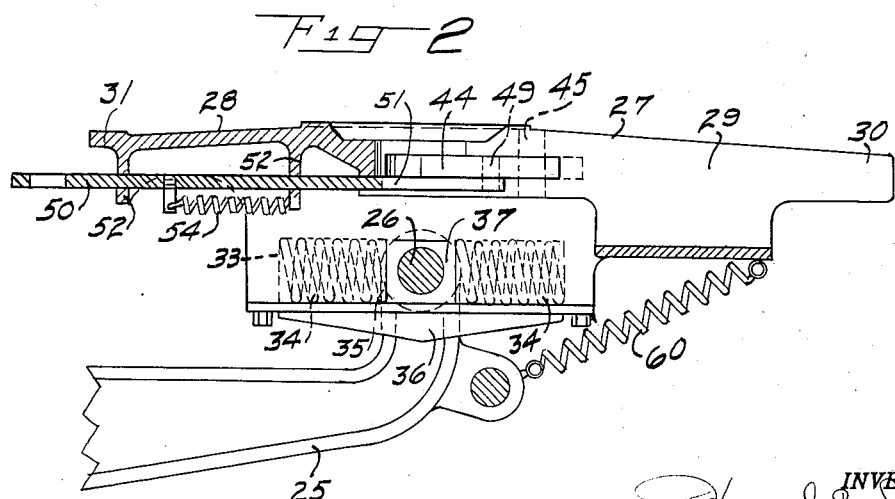
INVENTOR
Howard E. Swift
BY Morgan Finnegan and Durham
ATTORNEYS

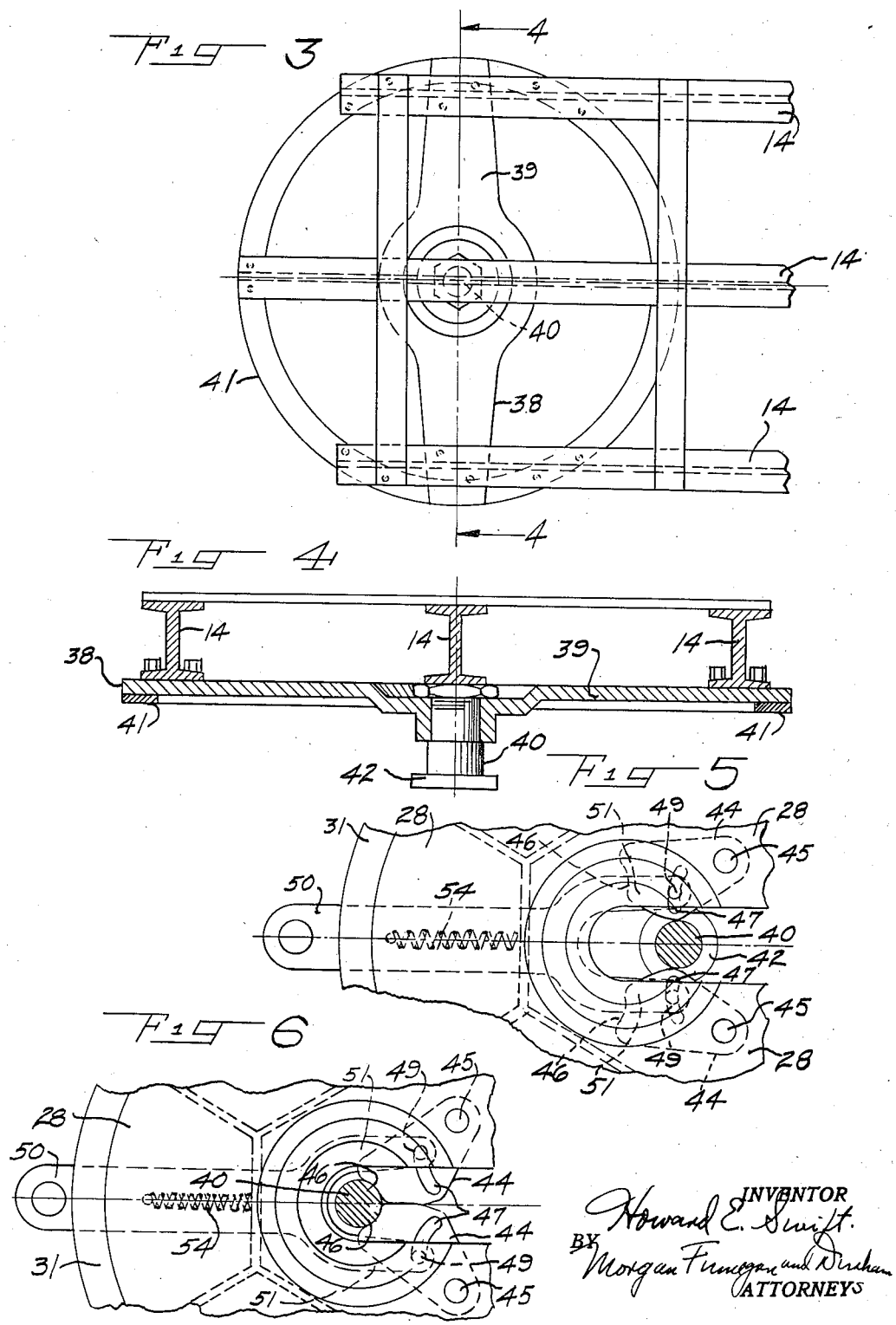

Patented May 26, 1936

2,042,079

UNITED STATES PATENT OFFICE 2,042,079

AUTOMOTIVE VEHICLE

Howard E. Swift, Westfield, Mass., assignor to The Martin Trailer Company, Westfield, Mass., a corporation of Massachusetts Original application April 24, 1930, Serial No. 446,869. Divided and this application June 25, 1932, Serial No. 619,206. Renewed October 24, 1935

8 Claims. (Cl. 280—33.1)

The present invention relates to motor vehicles and more particularly to a new and improved fifth wheel lock for coupling together a tractor unit and a trailer unit.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a detailed fragmentary plan of the coupling mechanism carried by the tractor unit, certain parts being broken away;

Fig. 2 is a vertical section taken on the line 2—2 of Fig. 1;

Fig. 3 is a detailed plan view of the coupling mechanism carried by the trailer unit, with certain parts broken away;

Fig. 4 is a vertical cross section taken on the line 4—4 of Fig. 3;

Fig. 5 is a detailed fragmentary plan view of the coupling mechanism showing the parts in uncoupling position; and Fig. 6 is a view similar to Fig. 5, with the parts locked in coupled relation.

The present invention has for its object the provision of a novel and improved fifth wheel lock for use with semi-trailers. A further object is the provision of a fifth wheel coupling mechanism comprising a relatively few inexpensive parts.

In certain aspects the present invention is an improvement upon the construction shown in the patent to Martin and Farr No. 1,412,025 but in other aspects it is not so limited.

As is usual, the trailer unit comprises a semi-trailer in which the load is carried in part by one or more pairs of wheels near the rear end of the trailer frame, and in part by the motor truck to which the front end of the trailer unit is coupled, and the present invention provides coupling means for supporting the weight of the front end of the trailer and for coupling the motor truck and trailer unit together in driving relation.

The coupling means of the present invention comprise a fifth wheel mechanism having means for pivotally and yieldingly coupling the trailer unit to the motor vehicle and one of the cooperating fifth wheel members is preferably pivotally mounted on and supported by the frame of the motor truck. As embodied, a pair of relatively heavy and strong arms 25 are riveted or otherwise securely fastened to the longitudinally extending body frame members at either side of the motor truck. Near their rear ends, these arms are each provided with apertures into which is fastened a shaft 26 extending from one arm to the other and transversely of the body frame of the motor truck, which shaft pivotally supports the lower fifth wheel member 27, to be coupled with the cooperating fifth wheel member carried by the trailer unit.

As shown in detail in the accompanying drawings, the lower fifth wheel member 27 comprises a generally circular casting 28 provided with a longitudinal opening having rearwardly divergent sides 29 between the rearwardly extending ears 30 which project beyond the general circular contour of the fifth wheel member providing an opening gradually diminishing forwardly of the fifth wheel to guide the king pin carried by the upper and cooperating fifth wheel member. Near, or at, its periphery and on the upper face of the lower fifth wheel is formed a narrow track 31 to form a bearing or supporting surface cooperating with a similarly shaped portion on the lower side of the cooperating upper fifth wheel member.

At either side of the casting are formed downwardly extending portions 32 provided with box-like recesses 33 to receive and retain the opposed springs 34 and to permit yielding movement of the trailer unit relative to the tractor unit or motor truck. At either side of the casting and intermediate these boxes is provided an opening 35 which together with the plate 36 closing the lower side of the box-like recesses 33 forms a slideway in which is fitted a slidable block 37 which is rotatably mounted on the supporting shaft 26 and these slidable blocks at either side of the fifth wheel pivotally and yieldingly support the lower fifth wheel member on the supporting shaft 26 which is mounted on the frame of the motor truck.

The upper fifth wheel member 38, to cooperate with the lower fifth wheel member just described, is preferably of substantially standard construction and comprises a cross member 39 securely fastened to the longitudinally extending frame members 14 of the semi-trailer and is provided with a king pin 40 at its center, and a circular bearing surface or track 41, corresponding in shape and size to the supporting track 31 around the periphery of the lower fifth wheel member carried by the truck. The king pin 40, as is usual, is formed with an enlarged portion 42 at its lower end to prevent the king pin being raised out of coupling relation with the lower fifth wheel member, once the two fifth wheel members have been coupled together.

Locking means are provided for coupling the fifth wheel members together and for preventing the trailer from being pulled apart from the motor truck after the two vehicles have been coupled together. As embodied, these means comprise a pair of locking dogs 44, at either side of the longitudinal and rearwardly extending opening in the lower fifth wheel member, these dogs being pivoted to the under surface of the lower fifth wheel casting by pins 45 and being provided with concave faces 46 to engage the king pin on the upper fifth wheel. The dogs are preferably so positioned relative to the opening, to each other, and to the king pin 40, that a rearward pull on the king pin tends to press the dogs more firmly together and securely holds the king pin in engagement with the lower fifth wheel member.

For opening and closing the dogs to lock and release the king pin, the dogs are each formed with an eccentric slot 47 adapted to be engaged by pins 49 carried by the rear forked ends 51 of the lock operating slide 50 which is slidably mounted on the under side of the lower fifth wheel casting 28 in suitable alined guideways formed in depending webs 52. For moving the dogs 44 away from each other for the purpose of unlocking the king pin 40 and uncoupling the vehicles, operating slide 50 is preferably connected by means of a cord or cable with an operating handle located near the driver's seat, on the tractor (not shown) so that by pulling on the handle, the operator may pull the operating slide 50 forwardly, thereby moving the dogs into the position shown in Figure 5, so that the king pin easily slips past the dogs and permits the vehicles to be uncoupled. It is, of course, understood that prior to uncoupling the vehicles, the operator will lower a prop for supporting the front end of the trailer unit after it has been released from the motor vehicle.

In order to facilitate coupling and uncoupling of the trailer unit, the inner and adjacent sides of dogs 44, are preferably both rearwardly and forwardly divergent, so that as the motor truck is backed toward the trailer unit to couple the vehicles together, the dogs will be automatically moved apart until the king pin is in the center of the lower fifth wheel, when the spring 54 will act to move the operating slide rearwardly to close the dogs together. The forwardly divergent sides are provided to insure uncoupling of the vehicles after the operator has moved the dogs apart to a considerable extent, but not necessarily a sufficient amount to space them a greater distance from each other than the diameter of the king pin.

As embodied, means are preferably provided for insuring the tilting of the lower fifth wheel member into the position shown by Figure 2 of the drawings so that it will be held in position ready to be coupled with the cooperating fifth wheel member carried by the trailer unit, and for this purpose a spring 60 may be provided, connected to the lower side of the fifth wheel member 28 and at the rear thereof, as well as to the arms 25 carried by the motor truck and supporting the lower fifth wheel member.

The present application is a division of my prior application Serial No. 446,869, filed April 24, 1930.

The invention in its broader aspects is not limited to the specific mechanisms shown and described but departures may be made therefrom within the scope of the accompanying claims without departing from the principles of the invention and without sacrificing its chief advantages.

What I claim is:—

1. In a coupling device for semi-trailers including a plate having a slot therein, a king pin to enter said slot and be held therein, the combination of a pair of locking members, one on either side of said slot, pivoted and normally having their free ends in contact with each other and adjacent to said pin and each provided with a spiral slot, slidable means mounted on said plate and provided with pins engaging in said spiral slots to operate said locking members by said slidable means.

2. In a coupling device for semi-trailers including a plate having a slot therein, a king pin to enter said slot and be secured therein, the combination of a pair of locking members each provided with a camming slot, one on either side of said slot and pivotally movable into pin securing position, slidable means mounted on said plate and carrying pins cooperating with said camming slots to connect said means and members for oscillating said members by movement of said means.

3. In a coupling device for semi-trailers including a plate having a slot therein, a king pin to enter said slot and be secured therein, the combination of a pair of locking members each provided with a camming slot, one on either side of said slot and movable into pin securing position, means movably mounted on said plate and carrying pins cooperating with said camming slots to connect said members and means for moving said members to pin locking and unlocking positions by movement of said means.

4. In a coupling device for semi-trailers including an annular plate having a radial slot therein to cooperate with a plate having a central king pin, the combination of a pivoted locking member formed with a camming slot movable to obstruct said opening and retain a king pin therein, a member slidably mounted in said first plate and provided with a projecting pin to engage in the camming slot in said locking member.

5. In a coupling device for semi-trailers including an annular plate having a radial slot therein to cooperate with a plate having a central king pin, the combination of a pair of locking members each provided with a camming slot, one on either side of said slot projecting centrally of said annular plate and pivoted on their ends away from said king pin, a member slidable in said plate and having a forked end carrying operating members projecting into said camming slot in said locking members to spread or move them together.

6. In a coupling device for semi-trailers including an annular plate having a radial slot therein to cooperate with a king pin supported on a semi-trailer, the combination of a pair of locking members each provided with a camming slot, pivoted one on either side of said slot, and normally centrally directed towards each other, an operating member slidably mounted in said plate and provided with a forked end to surround said pin, pins carried by said forked end and projecting into said camming slots to move said locking members to unlocking position by movement of said operating member.

7. In a coupling device for semi-trailers including a plate having a slot therein, a king pin to enter said slot and be secured therein, the combination of a pivoted locking member to be moved to slot obstructing position to secure said pin against uncoupling movement, an operating member movably mounted on said plate and a cooperating pin and slot connection between said operating and locking members formed by a slot in one of said members and a pin carried by the other side members for reversibly moving either member by movement of the other.

8. In a coupling device for semi-trailers including a plate having a slot therein, a king pin to enter said slot and be secured therein, the combination of pivoted locking members, one on each side of said slot said members being directed towards each other and said pin in coupled position and provided with slots, an operating member slidably mounted on said plate and provided with a forked end to fit around said pin, pins on said fork and engaging in said slot and means normally tending to move said operating and locking members to pin securing position.

HOWARD E. SWIFT.